UNITED STATES PATENT OFFICE

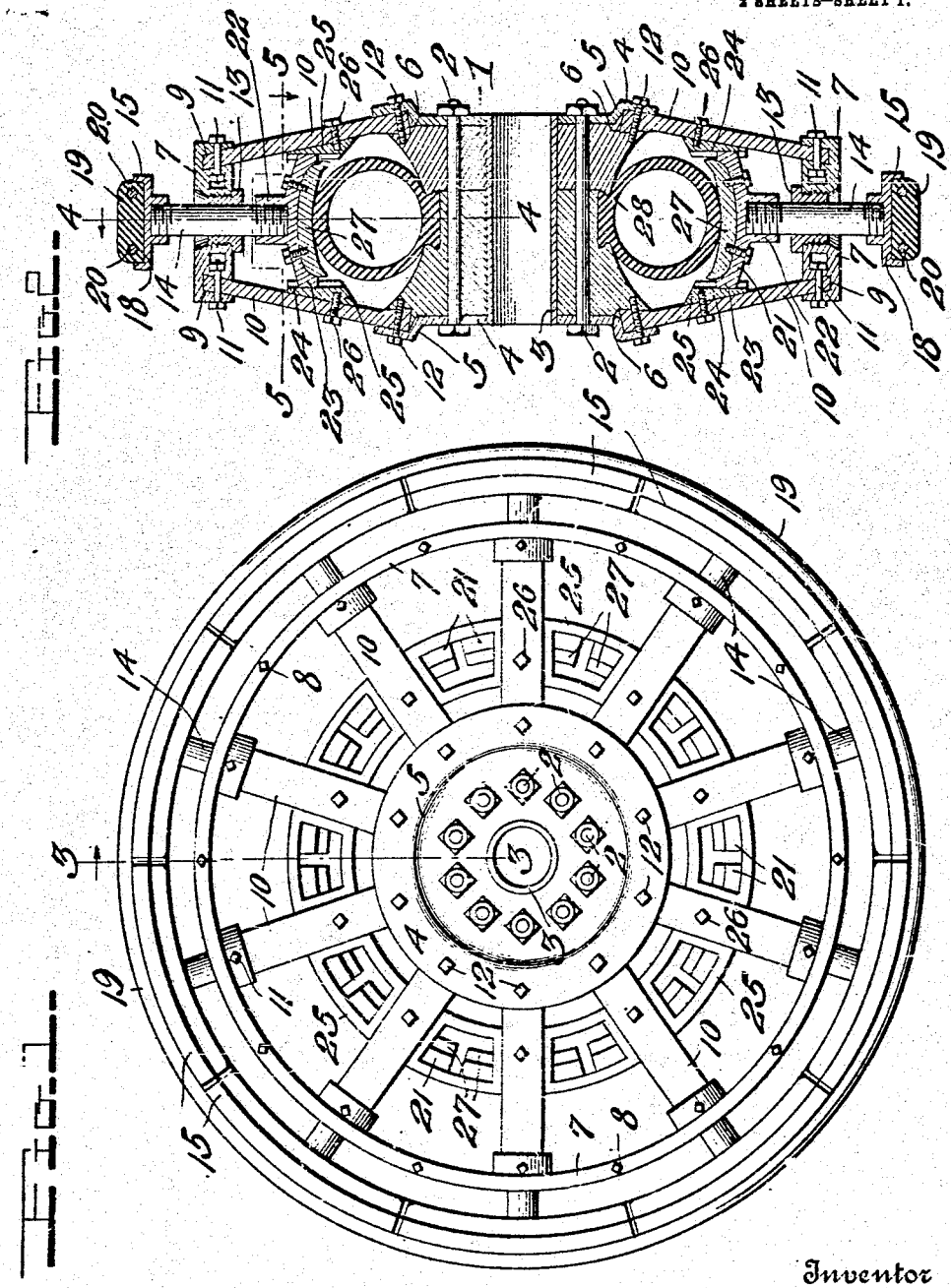

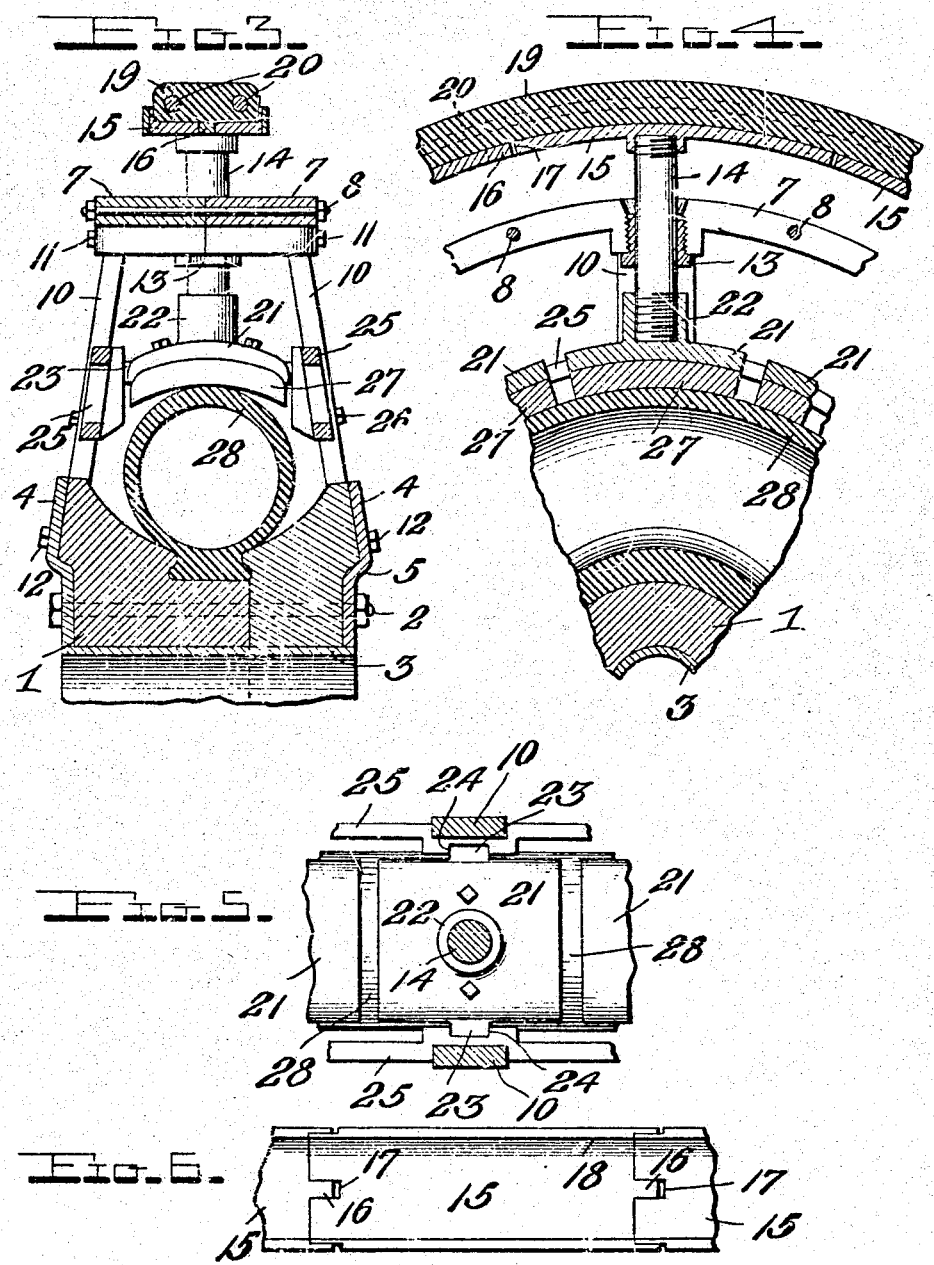

MAYNARD H. ALDRIDGE, OF PLATTSBURG, NEW YORK.

CUSHIONED VEHICLE-WHEEL.

971,100.  Specification of Letters Patent.  Patented Sept. 27, 1910.

Application filed January 13, 1910. Serial No. 537,869.

*To all whom it may concern:*

Be it known that I, MAYNARD H. ALDRIDGE, a citizen of the United States, residing at Plattsburg, in the county of Clinton and State of New York, have invented certain new and useful Improvements in Cushioned Vehicle-Wheels; and I do declare the following to be a full, clear, and exact description of the invention, such as will enable others skilled in the art to which it appertains to make and use the same.

This invention relates to improvements in cushioned vehicle wheels.

One object of the invention is to provide a wheel of this character having arranged therein a pneumatic cushion which will provide all the advantages of the usual pneumatic tire without danger of being punctured.
Another object is to provide a cushion wheel in which each spoke is a unit in itself and works independently of the other spokes.

With the foregoing and other objects in view, the invention consists of certain novel features of construction, combination and arrangement of parts as will be more fully described and particularly pointed out in the appended claims.

In the accompanying drawings, Figure 1 is a side view of a wheel constructed in accordance with the invention; Fig. 2 is a vertical cross section of the same taken on a line with two of the spokes, the outer rim being shown as of a slightly different form; Fig. 3 is a similar view on the line 3—3 of Fig. 1; Fig. 4 is a central vertical sectional view of a portion of the wheel on the line 4—4 of Fig. 2; Fig. 5 is a detail horizontal sectional view on the line 5—5 of Fig. 2; Fig. 6 is a plan view of a portion of the outer sectional rim of the wheel showing the manner in which the ends of the rim sections are slidably connected together.

Referring more particularly to the drawings, 1 denotes the hub of the wheel which is divided transversely to form two sections which are clamped together by clamping bolts 2 as shown. The hub is provided with a suitable bearing box 3, which is herein shown as formed in one piece. On each end of the hub is arranged an annular plate 4, said plates being secured to the hub by the clamping bolts 2. The plates 4 are provided around their outer edges with annular offset flanges 5, and the outer edges of the hub section are provided with annular recesses 6, which coöperate with the off-set annular flanges 5 of the plates 4 to form annular channels, the purpose of which will hereinafter appear.

Arranged around the hub 1 and spaced a suitable distance therefrom is an inner annular rim 7 which is divided transversely into two counterpart sections which in practice are bolted together at suitable intervals by clamping bolts 8. The rim 7 is formed in sections as described to facilitate the application and removal of the same from the wheel. On the inner side of the rim 7 adjacent to each edge is formed a series of spoke receiving sockets 9 which are arranged in pairs, the sockets of each pair being directly opposite each other as shown. Engaged at their outer ends with the sockets 9 are a series of stationary spokes or braces 10, the inner ends of which are enlarged or beveled as shown and engaged in the channels formed by the recesses 6 of the hub and the flanges 5 of the plates 4. The spokes or braces 10 are secured at their outer ends in the sockets 9 by fastening bolts 11 and at their inner ends are secured in the channels of the hub by fastening screws 12.

In the rim 7 opposite each pair of sockets 9 are formed threaded apertures in which are screwed guide bushings 13. In the guide bushings 13 are slidably mounted a series of cushion spokes 14, on the outer end of each of which is secured an outer rim section 15, said rim sections being provided on their inner sides with threaded sockets into which the threaded outer ends of the spokes 14 are screwed. The rim sections 15 are provided on one end with longitudinally extending tongues 16 and in their opposite ends with grooves or notches 17, whereby when said ends of the sections are brought together, the tongues of one section will fit into the grooves and notches of the adjoining section, whereby an interlocking slidable connection is provided for the rim sections, whereby they are held against lateral or twisting movement but are permitted to freely move inwardly or outwardly toward or from the hub of the wheel. In each of the rim sections is formed a channel 18 which, when the sections are arranged in position around the wheel, form a continuous channel in which is arranged a solid rubber tire 19 which may be of any suitable shape and is here shown as being provided with continuous reinforcing rods or wires 20. The rim sections 15 and the tire 19 are held in proper position around the wheel and are spaced a suitable distance from the inner stationary rim 7.

Secured to the inner ends of the spokes 14 are a series of segmental cushion seats 21, said seats being provided on their outer sides with threaded sockets 22 in which are screwed the inner threaded ends of the spokes 14. On the opposite sides of the seats 21 midway between their ends are formed laterally projecting guide lugs 23, which are adapted to be engaged with vertically disposed guide grooves 24 formed in the inner sides of annular guide rings 25 which are arranged on the inner sides of the spokes 10 between the hub and the rim 7 as shown. The rings 25 are secured to the spokes by screws 26 or other suitable fastening devices. The rings 25 are preferably of skeleton form and serve to brace the spokes 10 as well as to provide the guide grooves 24 for the cushion seats 21. Secured to the inner side of the cushion seats 21 are pads 27, said pads being secured to the seats 21 by screws or other fastening devices as shown.

The outer annular surface of the hub 1 is concave and engaged with said concave surface of the hub and arranged between the same and the series of pads 27 and the cushion seats 21 is a pneumatic cushioning tube 28, which is constructed similarly to a pneumatic tire and is adapted to yieldingly hold the cushion spokes 14 and the rim sections 15 carried thereby in an operative position in the wheel. The cushion tube 28 is secured around its inner side in an annular groove 29 formed in the outer concave surface of the hub, as shown.

By arranging the cushion spokes and forming the outer rim in independent sections, each of which is connected to a separate spoke, it will be seen that each of said cushion spokes will move independently of the other spokes as the wheel revolves and that any jars or shocks occasioned by the wheel passing over rough or uneven surfaces will be absorbed by the cushion tube 28 with which the inner ends of the cushion spokes are engaged through the cushion seats secured to said inner ends of the spokes.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a wheel of the character described, a hub, an inner stationary rim, a series of bracing spokes to secure said rim to the hub, guide rings secured to the inner sides of said spokes, said rings having formed therein oppositely disposed guide grooves, a series of cushion spokes slidably mounted in said inner stationary rim, an outer rim formed of a series of independent segmental sections each of which has a sliding interlocking engagement with the end of the next adjacent section, a tire arranged around said sectional rim, a pneumatic cushion arranged around said hub, a series of segmental cushion seats secured to the inner ends of said cushion spokes, guide lugs formed on the opposite edges of said seats and adapted to engage the grooves in said guide rings, pads arranged on the inner sides of said cushion seats and adapted to engage said pneumatic cushion whereby the cushion spokes are yieldingly held in position on the wheel.

2. In a wheel of the character described, a hub divided transversely into two sections, clamping bolts to secure said sections together, annular plates arranged on the opposite ends of the hub and secured thereto by said clamping bolts, a bearing box arranged in the hub, an inner transversely divided stationary rim, said rim having formed therein a series of sockets, a series of bracing spokes secured at their outer ends in the sockets of said rim and at their inner ends between said plates and the ends of the hub, a series of cushion spokes slidably mounted in said inner rim, a sectional rim secured to the outer ends of said cushion spokes, a tire arranged in said rim, and a series of cushion seats secured to the inner ends of said cushion spokes and an annular pneumatic cushion arranged around said hub and adapted to be engaged by the cushion seats of said spokes whereby the latter are yieldingly held in position to form the wheel.

In testimony whereof I have hereunto set my hand in presence of two subscribing witnesses.

MAYNARD H. ALDRIDGE.

Witnesses:
HENRY P. GILLILAND,
FRANK W. JUDGE.